United States Patent
Obermann et al.

[11] 3,882,734
[45] May 13, 1975

[54] TWO-SPEED CONSTANT DRIVE TIMER

[75] Inventors: George Obermann, Niles; John Willigman, Elk Grove Village, both of Ill.

[73] Assignee: Controls Company of America, Schiller Park, Ill.

[22] Filed: Nov. 19, 1973

[21] Appl. No.: 416,982

[52] U.S. Cl. .............. 74/337.5; 74/359; 74/368; 192/48.92; 192/89 A; 192/93 B
[51] Int. Cl. .......................................... F16h 5/06
[58] Field of Search ............... 74/368, 359, 337.5; 192/48.92, 89 A, 93 B

[56] References Cited
UNITED STATES PATENTS

| | | | |
|---|---|---|---|
| 1,124,280 | 1/1915 | Brackett | 74/368 X |
| 2,332,743 | 10/1943 | Morris | 192/89 A |
| 2,391,718 | 12/1945 | Lindemann | 74/368 |
| 2,493,738 | 1/1950 | Cuttat | 74/368 |
| 2,551,922 | 5/1951 | Aueta | 192/89 A |
| 2,724,322 | 11/1955 | Parr | 74/368 X |
| 3,190,976 | 6/1965 | Ellis et al. | 74/368 X |
| 3,664,207 | 5/1972 | White | 192/48.92 |

*Primary Examiner*—Samuel Scott
*Assistant Examiner*—John Reep
*Attorney, Agent, or Firm*—Michael, Best & Friedrich

[57] ABSTRACT

In the low speed setting the motor drive pinion drives the cam drum internal gear through a gear train which includes a one-way, spring loaded, ratchet coupling. When the lever is moved to the high speed setting, it removes the spring load holding the clutch output out of engagement with the input so the clutch spring can engage the high speed clutch which results in driving the cam drum at high speed. Since the clutch output and the output of the one-way drive are connected through gearing, the one-way drive overrides its input while the cam drum is driven at high speed. At low speed the clutch output is driven from the cam drum but the clutch is disengaged.

1 Claim, 7 Drawing Figures

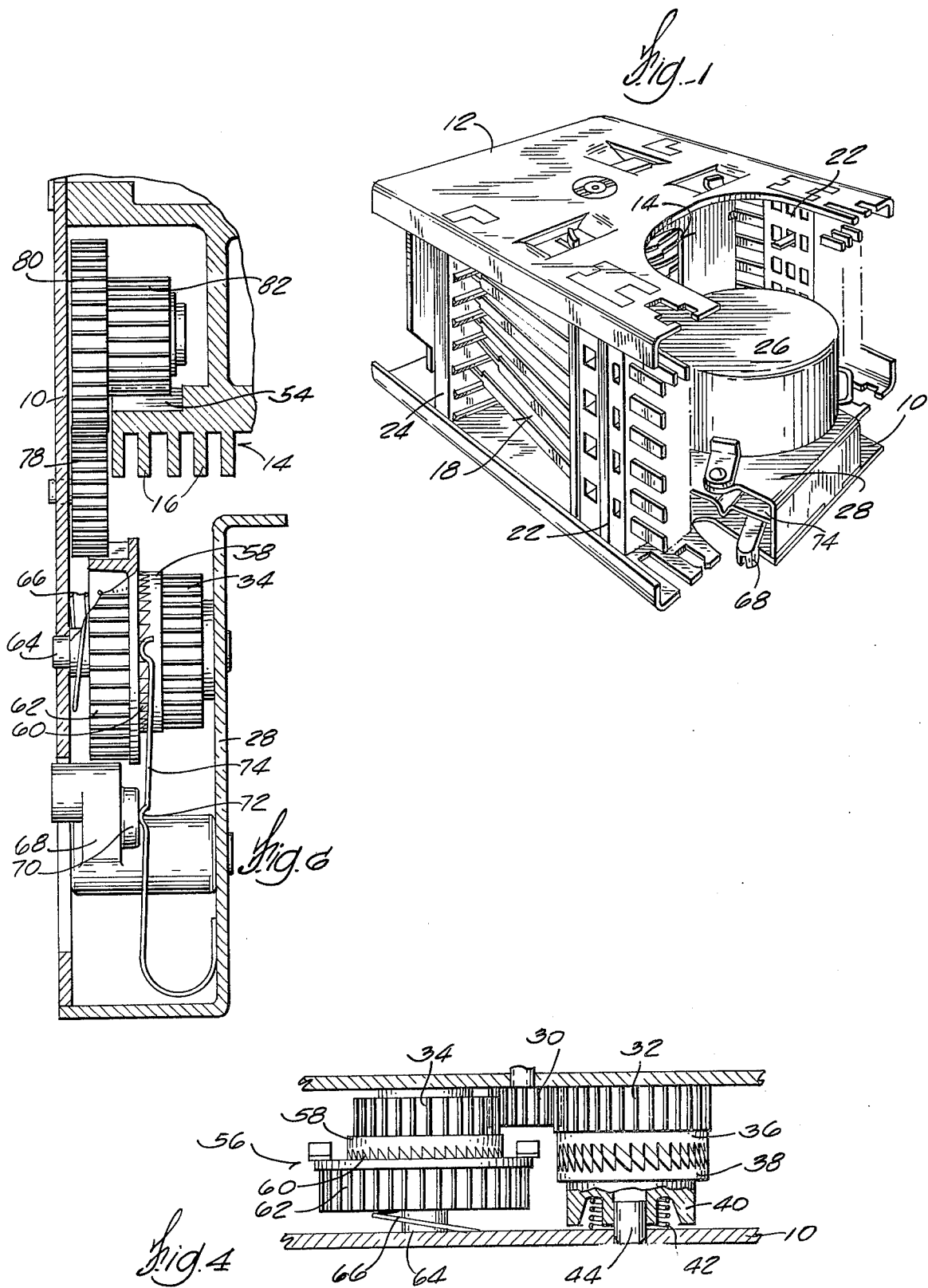

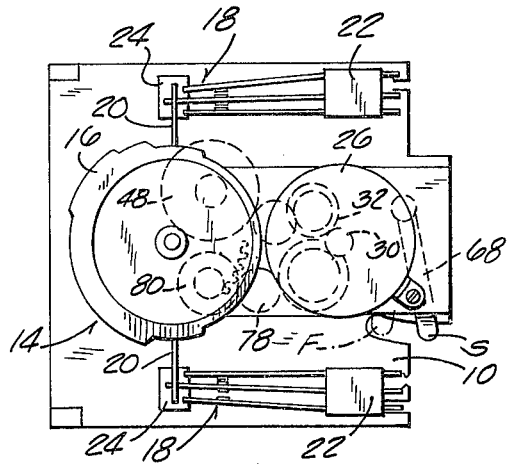
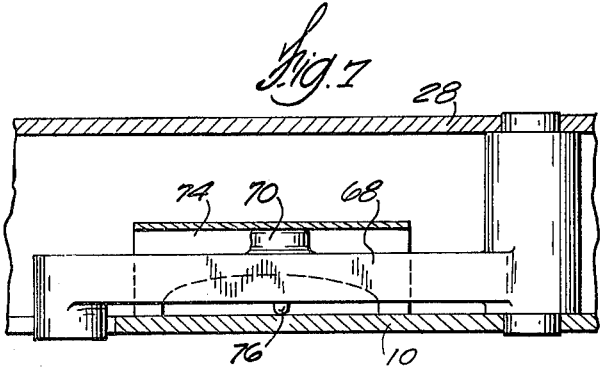
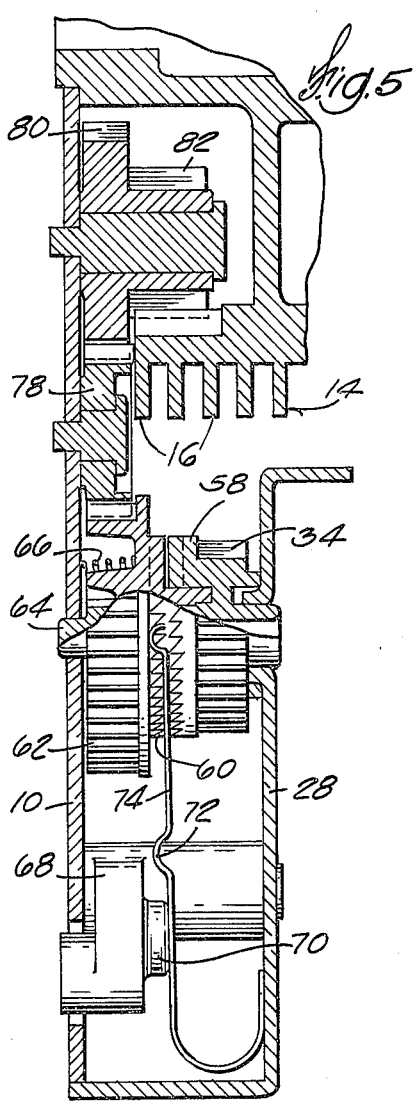
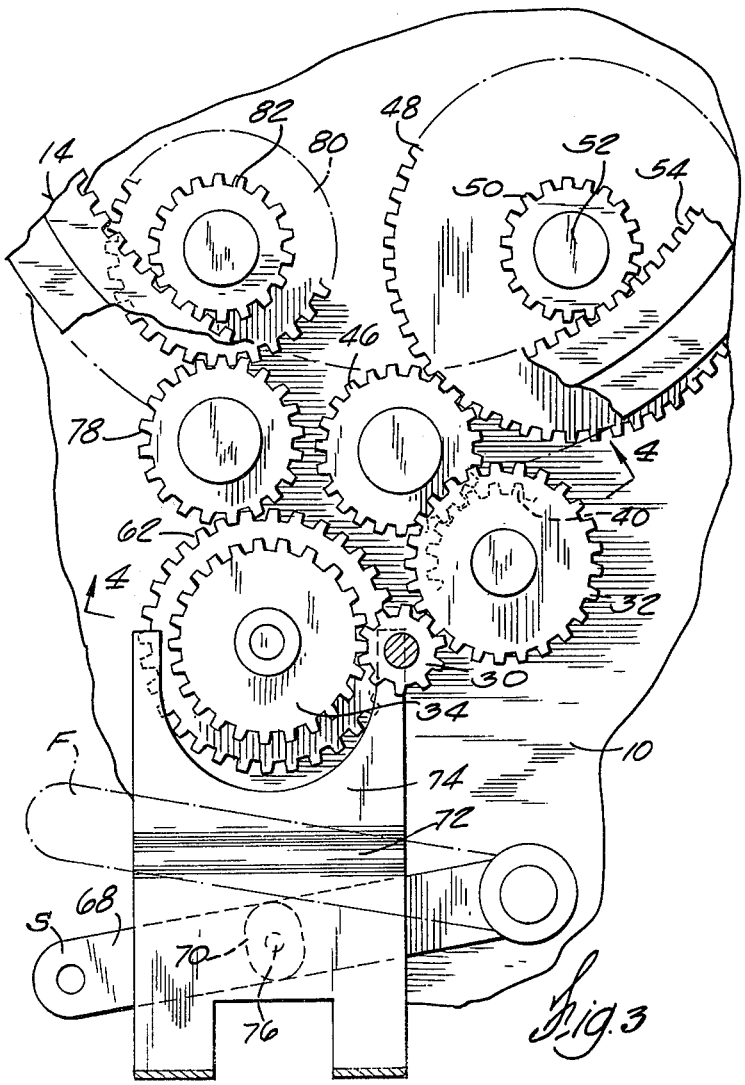

TWO-SPEED CONSTANT DRIVE TIMER

BACKGROUND OF THE INVENTION

Prior Art. In certain clothes washer and dryer timer applications it is desirable to have two timing speeds. To attain the necessary reliability, this has generally been accomplished with a double clutch arrangement in which each clutch is actuated. That arrangement is costly and critical in production.

SUMMARY OF THE INVENTION

With the construction described above, only one simple clutch is required while the one-way drive accommodates the speed differences when the clutch is engaged. This reduces costs and retains a basic simplicity in that the high and low speed gear trains are always connected to the driven cam drum and, hence, to each other. The motor is a single speed motor which can be produced at low cost.

DESCRIPTION OF THE DRAWINGS

FIG. 1 is a perspective view of the timer.
FIG. 2 is a top plan view with the top plate removed.
FIG. 3 is an enlarged view of the high and low speed gear trains.
FIG. 4 is a section taken on line 4—4 in FIG. 3 showing the high speed clutch engaged and the overrunning clutch in act of overrunning.
FIG. 5 is an enlarged fragmentary view of the high speed clutch in the disengaged position.
FIG. 6 is similar to FIG. 5 but shows the clutch engaged.
FIG. 7 is a detail view of the actuating arm.

DESCRIPTION OF THE PREFERRED EMBODIMENT

The timer has spaced parallel plates 10, 12 between which the timing cam bank or drum 14 is journaled for continuous advance in this instance but it could be advanced step-by-step without departing from this invention. The outside of the drum has a plurality of cams 16 molded thereon for actuating switches 18 through followers 20 to control the various machine circuits. The switches are contained in a molded subassembly 22 mounted between the plates and the followers are guided in block 24 mounted between the plates. The details of the switches and followers form no part of this invention.

The drive motor 26 is mounted on plate 28 and includes appropriate reduction gearing driving drive pinion 30 at a constant speed. The drive pinion constantly engages gears 32 and 34. Gear 32 has a ratchet 36 on the underside engaged by ratchet 38 on the top of gear 40 biased upwardly by spring 42. Gear 40 rotates on stub shaft 44 which is a part of gear 32 and is journaled in plate 10. In low speed drive ratchet 36 drives ratchet 38 so gears 32 and 40 rotate at the same speed to drive idler gear 46 which turns the large gear 48 and the small gear 50 mounted on shaft 52. Gear 50 drives the internal gear 54 on the inside of the cam bank to rotate the timing cams at slow speed. This drive operates providing the high speed clutch 56 is disengaged.

The input to the high speed clutch 56 is a ratchet 58 on the underside of gear 34 driven by the drive pinion 30. The output of clutch 56 is ratchet 60 on top of gear 62 which rotates on shaft 64 and is biased by spring 66 into engagement with the input ratchet. The output can be engaged by moving selector arm 68 from the position shown in FIGS. 2 and 3 in full lines to the position shown in dotted lines in FIGS. 2 and 3 and results in engagement of the ratchet as shown in FIG. 6. In the slow speed position of the selector arm, as shown by full lines in FIGS. 2 and 3, the arm, pivoted between plates 10 and 28, is located so pad 70 does not lie under the depending hump 72 formed on the U-shaped spring 74 secured to plate 28 and having a bifurcated end straddling the clutch and bearing against the output to move the output out of engagement with the input as shown in FIG. 5, spring 74 being stronger than spring 66. When the arm 68 is moved to the position shown in FIG. 6, the pad 70 moves under hump 72 to force spring 74 to the inactive position and allow spring 66 to move the output into engagement with the input. The arm 68 is provided with a finger 76 bearing against plate 10 to absorb the thrust of spring 74 to insure control of the clutch output.

When the high speed clutch is engaged, gears 34 and 62 rotate together to turn idler 78. Idler 78 turns gears 80 and 82 with gear 82 engaging internal gear 54 to drive the cam bank at high speed. Under these conditions the internal gear drives gears 50, 48, idler gear 46, and gear 40 on the output side of the one-way slow speed drive. This means gear 40 is rotated faster than gear 32 and, therefore, the output ratchets 36, 38 overrun the input by camming themselves out of engagement by overcoming spring 42.

When the selector 68 is moved to the slow speed position, the high speed clutch is disengaged by spring 74 but gear 62 continues to rotate by reason of being driven by the slow speed drive through the internal gear.

Thus by providing an actuated clutch in the high speed drive train and an overrunning clutch in the slow speed drive train with both trains driving a common driven gear (the internal gear in this case or through another mechanism which would impart a stepping motion to the cam 14), two speed operation is obtained while actuating only one clutch and both clutches are of a non-critical nature.

We claim:
1. A two-speed timer including
a frame,
a timing cam rotatably mounted in the frame,
a motor mounted in the frame and having a drive pinion,
a slow speed gear train having an input gear driven by the drive pinion and including an overrunning clutch having an input and an output and located at the input to the gear train with the clutch input driven by said input gear and the clutch biased into engagement with the clutch input with an overrunning ratchet drive between the clutch input and output so the clutch output overruns the clutch input if rotated faster than the clutch input,
a selectively operable high speed clutch including an input and an output and having its input continuously driven by the pinion,
said high speed clutch output being rotatably mounted on the frame and axially movable on its rotational axis into engagement with the high speed clutch input,
a coil spring acting between the frame and the high speed clutch output biasing the high speed clutch output into engagement with the high speed clutch input, a beam-type spring mounted on the frame and bearing on the high speed clutch output and operative to overcome said coil spring to move the high speed clutch output out of engagement with the high speed clutch input, a lever pivoted on the frame and manually movable from an inoperative position to an operative position in which it acts on the beam-type spring to move it to an inoperative position whereby the high speed clutch is engaged, said high speed clutch output including a gear driving a high speed gear train, the output of both gear trains driving a common gear operatively connected to the timing cam whereby the slow speed gear train drives back to the over-running clutch output during operation of the high speed drive.

* * * * *